(12) United States Patent  
Chatwin

(10) Patent No.: US 8,314,660 B2  
(45) Date of Patent: Nov. 20, 2012

(54) SYSTEM AND METHOD FOR EFFECTIVELY IMPLEMENTING A UNIT GM CELL

(75) Inventor: Jeremy Chatwin, Santa Cruz, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/065,723

(22) Filed: Mar. 29, 2011

(65) Prior Publication Data

US 2012/0250794 A1 Oct. 4, 2012

(51) Int. Cl.
*H03F 3/08* (2006.01)
(52) U.S. Cl. ........................ 330/308; 330/311
(58) Field of Classification Search ............... 330/308, 330/311, 251, 207 A
See application file for complete search history.

(56) References Cited

U.S. PATENT DOCUMENTS

| | | | |
|---|---|---|---|
| 5,059,922 A * | 10/1991 | Mahabadi | 330/264 |
| 5,742,205 A * | 4/1998 | Cowen et al. | 330/269 |
| 5,892,540 A | 4/1999 | Kozlowski et al. | |
| 6,163,211 A * | 12/2000 | Morrish | 330/98 |
| 6,720,826 B2 | 4/2004 | Yoon | |
| 6,737,924 B1 * | 5/2004 | Paillet et al. | 330/308 |
| 7,389,087 B2 * | 6/2008 | Darabi et al. | 455/20 |
| 7,562,581 B2 | 7/2009 | Garverick et al. | |
| 2002/0153949 A1 | 10/2002 | Yoon | |

FOREIGN PATENT DOCUMENTS

GB 2424138 A 9/2006

OTHER PUBLICATIONS

Raut, R., Ghasemi, O., A power Efficient Wide Band Trans-Impedance Amplifier in Sub-Micron CMOS Integrated Circuit Technology, Dept. of Electr. & Comput. Eng., Concordia Univ., Montereal, QC, http://ieeexplore.ieee.org/Xplore/login.jsp?reload=true
&url=http:%3A%2F%2Fieeexplore.ieee.
org%2Fiel5%2F4600187%2F4606305%2F04606334.
pdf%3Farnumber%3D4606334&authDecision=-203, Aug. 22, 2008, 1 page.
Kromer, C., Sialm, G., Morf, T., Schmatz, M.L., Ellinger, F., Erni, D., Jackel,H., A Low-Power 20GHz 52-dB Transimpedance Amplifier in 80-nm CMOS, http://ieeexplore.ieee.org/Xplore/login.
jsp?url=http%3A%2F%2Fieeexplore.ieee.
org%2Fiel5%2F4%2F28938%2F01302265.
pdf%3Farnumber%3D1302265&authDecision=-203, Volue:39 Issue:6, Jun. 1, 2004, 1 page.

* cited by examiner

*Primary Examiner* — Henry Choe
(74) *Attorney, Agent, or Firm* — Gregory J. Koerner; Redwood Patent Law

(57) ABSTRACT

An apparatus and method for effectively implementing a unit Gm cell includes an input P that receives an input P signal and an input N that receives an input N signal. The unit Gm cell further includes an output P that generates an output P signal that is connected through a first bias resistor to the input N. The unit Gm cell also includes an output N that generates an output N signal that is connected through a second bias resistor to the input P. The unit Gm cell features level-shifting resistors that cause the output P signal and the output N signal to be at different respective voltage levels. A Vcore supply voltage may thus be reduced by a voltage potential across the level-shifting resistors to operate the unit Gm cell with a reduced Vcore supply voltage.

20 Claims, 9 Drawing Sheets

US 8,314,660 B2

SYSTEM AND METHOD FOR EFFECTIVELY IMPLEMENTING A UNIT GM CELL

BACKGROUND SECTION

1. Field of the Invention

This invention relates generally to techniques for transferring electronic information, and relates more particularly to a system and method for effectively implementing a unit Gm cell.

2. Description of the Background Art

Implementing effective methods for transferring electronic information is a significant consideration for designers and manufacturers of contemporary electronic systems. However, effectively implementing data transfer systems may create substantial challenges for system designers. For example, enhanced demands for increased system functionality and performance may require additional hardware resources. An increase in hardware requirements may also result in a corresponding detrimental economic impact due to increased production costs and operational inefficiencies.

Furthermore, enhanced system capability to perform various advanced transfer operations may provide additional benefits to a system user, but may also place increased demands on the control and management of various system components. For example, an enhanced electronic system that effectively transfers digital image data may benefit from an effective implementation because of the large amount and complexity of the digital data involved.

Due to growing demands on system resources and substantially increasing data magnitudes, it is apparent that developing new techniques for implementing and utilizing data transfer systems is a matter of concern for related electronic technologies. Therefore, for all the foregoing reasons, developing effective systems for transferring electronic information remains a significant consideration for designers, manufacturers, and users of contemporary electronic systems.

SUMMARY

In accordance with the present invention, a system and method are disclosed for effectively implementing a unit Gm cell. In accordance with one embodiment, the unit Gm cell includes an input P that receives an input P signal, and an input N that receives an input N signal. The unit Gm cell further includes an output P that generates an output P signal that is connected through a first bias resistor to the input N. The unit Gm cell also includes an output N that generates an output N signal that is connected through a second bias resistor to the input P. The unit Gm cell features level-shifting resistors that cause the output P signal and the output N signal to be at different respective voltage levels. A Vcore supply voltage may thus be reduced by a voltage potential across the level-shifting resistors to operate the unit Gm cell with a reduced Vcore supply voltage.

In one embodiment of the invention, the unit Gm cell includes an upper-rail supply voltage (VD1) which provides a Vcore supply voltage to power the unit Gm cell. The Gm cell also includes a lower-rail voltage VS1 that is typically at or near a ground potential of zero volts. In certain embodiments, the gate of a P-channel transistor P receives an input signal P. The source of transistor P is connected to supply voltage VD1, and the drain of transistor P is connected to a first end of a first level-shifting resistor R1. An output signal P is generated at the junction of the drain of transistor P and the first end of level-shifting resistor R1.

In addition, the gate of an N-channel transistor N receives an input signal N. The source of transistor N is connected to voltage VS1, and the drain of transistor N is connected to a second end of a second level-shifting resistor R2. An output signal N is generated at the junction of the drain of transistor N and the second end of level-shifting resistor R2. Furthermore, a second end of level-shifting resistor R1 is connected to a first end of level-shifting resistor R2. A main output signal is generated at the junction of the second end of level-shifting resistor R1 and the first end of level-shifting resistor R2.

In certain embodiments, a main input signal is provided through a first coupling capacitor Cg to an input N of the Gm cell. Similarly, the main input signal is provided through a second coupling capacitor Cg to the input P of the Gm cell. In accordance with the present invention, the output P of the Gm cell is returned as a bias voltage through a first bias resistor Rg to the input N of the Gm cell. Similarly, the output N of the Gm cell is returned as a bias voltage through a second bias resistor Rg to the input P of the Gm cell.

The foregoing biasing configuration of the Gm cell advantageously reduces the required Vcore (VD1) for a given Icore, and hence a given Gm. Icore may be defined as the Gm cell supply current required to support a given effective transconductance or "Gm." This significant reduction in the required supply voltage VD1 provides substantial conservation of power resources for any electronic device that employs the unit Gm cell. For at least the foregoing reasons, the present invention therefore provides an improved system and method for effectively implementing a unit Gm cell.

DETAILED DESCRIPTION

The present invention relates to an improvement in data transmission systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively implementing a unit Gm cell, and includes an input P that receives an input P signal, and an input N that receives an input N signal. The unit Gm cell further includes an output P that generates an output P signal that is connected through a first bias resistor to the input N. The unit Gm cell also includes an output N that generates an output N signal that is connected through a second bias resistor to the input P. The unit Gm cell features level-shifting resistors that cause the output P signal and the output N signal to be at different respective voltage, levels. A Vcore supply voltage may thus be reduced by a voltage potential across the level-shifting resistors to operate the unit Gm cell with a reduced Vcore supply voltage.

Figure 1:
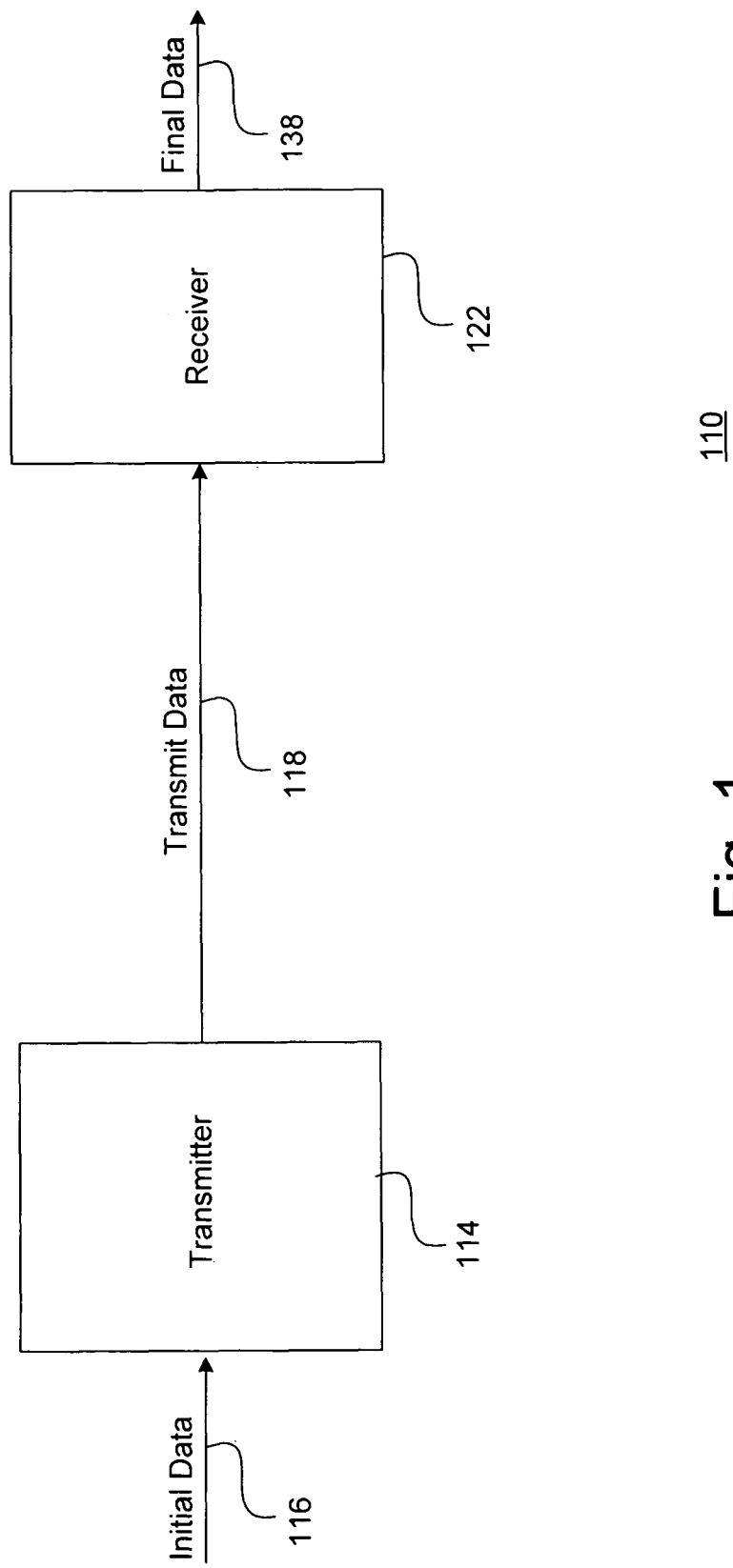
FIG. 1 is a block diagram of a data transmission system, in accordance with one embodiment of the present invention.

Referring now to FIG. 1, a block diagram of a data transmission system 110 is shown, in accordance with one embodiment of the present invention. In the FIG. 1 embodiment, data transmission system 110 includes, but is not limited to, a transmitter 114 and a receiver 122. In alternate embodiments, data transmission system 110 may be implemented using components and configurations in addition to, or instead of, certain of those components and configurations discussed in conjunction with the FIG. 1 embodiment.

In the FIG. 1 embodiment of data transmission system 110, a transmitter 114 receives initial data 116 from any appropriate data source. The transmitter 114 then sends the initial data 116 over any appropriate type of transmission channel as transmit data 118. A receiver 122 of data transmission system 110 may then receive and process the transmit data 118 to thereby provide final data 138 to any appropriate data destination.

Data transmission system 110 may thus transfer any desired type of electronic data or information between two separate locations via a transmission channel. These locations may be considerably distant (for example, between continents or between satellites), or may alternately be relatively close to each other (for example, between devices inside electronic equipment). A wide range of physical transmission media may be used to facilitate this transmission. Examples include electro-magnetic waves in free space (wireless transmission), or electro-magnetic waves in a constrained media (optical fiber, waveguides, cables, etc.).

In the FIG. 1 embodiment, data transmission system 110 thus transfers data from a transmitter (TX) 114 to a receiver (RX) 122 across a channel. In embodiments where data transmission system 110 is implemented as an optical data transmission system, a TX 114 launches a light wave, modulated with data, across a channel. The RX 122 receives the modulated light wave from the other end of the channel and converts the modulation back to data. The channel may be constrained (transmission across an optical fiber) or unconstrained (transmission through free space).

Typically, the TX 114 may include a serializer, a clock synthesizer, a method for adding pre-emphasis, a driver and an electrical to optical transducer. The serializer converts incoming low rate parallel words to high rate serial transmission symbols. The clock synthesizer generates the high rate clock used to transmit the serial transmission symbols. Pre-emphasis may be used to electrically format the serial transmission symbols to pre-compensate anticipated losses in the channel. The driver is used to interface to the electrical to optical transducer. The electrical to optical transducer may include a laser diode or VCSEL device that converts the electrical serial transmission symbols to modulated light.

Additional details regarding the implementation and utilization of receiver 122 are further discussed below in conjunction with FIGS. 2-7.

Figure 2:
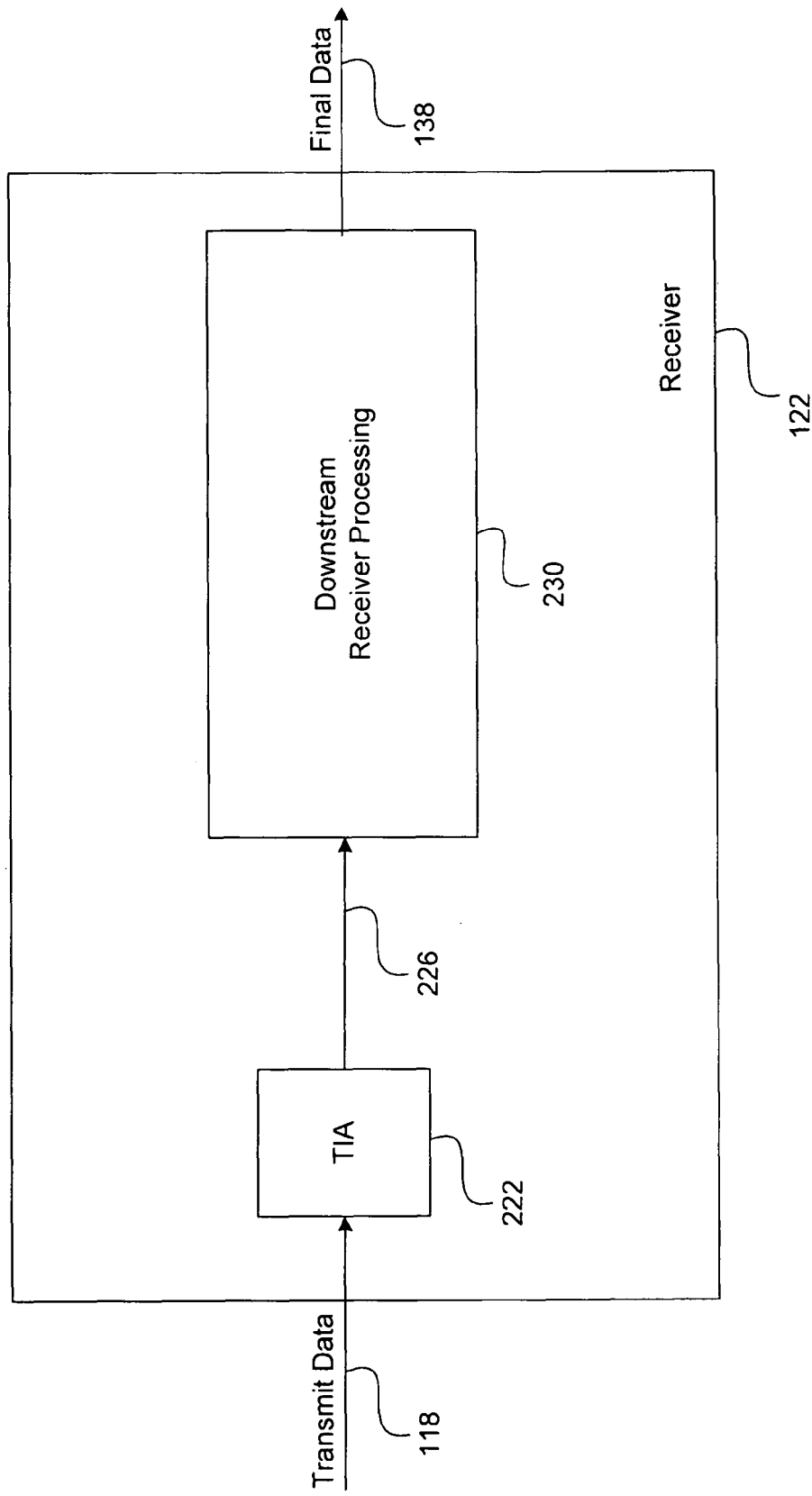
FIG. 2 is a block diagram for one embodiment of the receiver of FIG. 1, in accordance with the present invention.

Referring now to FIG. 2, a block diagram for one embodiment of the FIG. 1 receiver (RX) 122 is shown, in accordance with the present invention. In the FIG. 2 embodiment, receiver 122 may include, but is not limited to, a transimpedance amplifier (TIA) 222 and downstream receiver processing 230. In alternate embodiments, receiver 122 may be implemented using components and configurations in addition to, or instead of, certain of those components and configurations discussed in conjunction with the FIG. 2 embodiment. In various embodiments, receiver 122 may be implemented as any other appropriate type of electronic device.

In the FIG. 2 embodiment, transmit data 118 may be received from any desired data source, and may be encoded in any appropriate data format. For example, in certain embodiments, transmit data 118 may be received from a transmitter 114 of a data transmission system 110 (FIG. 1). In the FIG. 2 embodiment, the RX 122 may typically include an optical to electrical transducer (see FIG. 3), a transimpedance amplifier (TIA) 222, and downstream receiver processing 230 that includes, but is not limited to, a limiting amplifier (LA) or automatic gain control amplifier (AGC), an equalizer (EQ), a clock and data recovery unit (CDR) and a deserializer. The optical to electrical transducer is typical a photo diode (PD) or PIN diode which converts incoming modulated light to a low amplitude electrical signal.

A transimpedance amplifier (TIA) 222 is an integral component in an optical data transmission system. The TIA 222 amplifies the low amplitude electrical signal and produces a differential output voltage. The LA or AGC further amplifies the TIA output to a level suitable for further processing. An EQ may be used to compensate for signal distortions introduced by the channel and/or the transducers. The CDR synchronizes the incoming signal to a local clock and makes decisions as to the most likely transmitted data. The deserializer converts the received high rate serial data to a lower rate parallel word stream. Certain additional details for the implementation and utilization of TIA 222 are further discussed below in conjunction with FIGS. 3-7.

Figure 3:
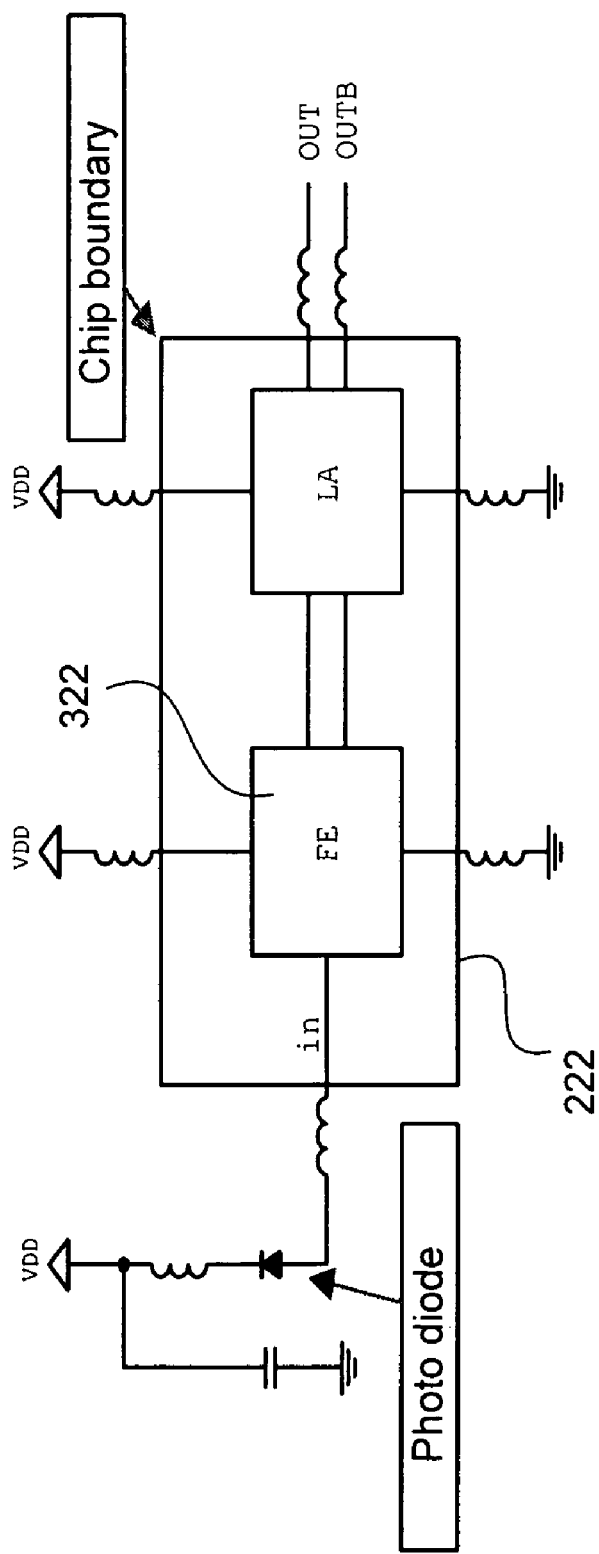
FIG. 3 is a block diagram for the transimpedance amplifier of FIG. 2, in accordance with one embodiment of the present invention.

Referring now to FIG. 3, a block diagram for the FIG. 2 TIA 222 is shown, in accordance with one embodiment of the present invention. The FIG. 3 diagram is presented for purposes of illustration, and in alternate embodiments, TIAs 222 may utilize components and configurations in addition to, or instead of, certain of those components and configurations discussed in conjunction with the FIG. 3 embodiment.

In the FIG. 3 embodiment, an optical to electrical transducer is typically a photo diode (PD) or PIN diode which converts incoming modulated light to a low amplitude electrical signal that is processed by a front end (FE) 322 which amplifies the low amplitude electrical signal and produces a differential output voltage. The LA or AGC further amplifies the FE output to a level suitable for further processing.

In the FIG. 3 embodiment, TIA 222 is typically a single chip comprising front end (FE) 322, which performs low noise amplification, DC cancellation and single ended to balanced conversion, and an additional buffer or amplifier (LA) to drive an output signal off chip. The TIA 222 may also contain additional devices to assist in biasing an optical to electrical transducer and to perform other ancillary tasks. In accordance with the present invention, FE 322 may include one or more unit Gm cells that function as transductors or gain cells. Unit Gm cells characteristically have a transconductance parameter referred to as "Gm" which refers to the ratio of the incremental change in output current to the incremental change in input voltage. Additional details for the implementation and utilization of unit Gm cells' are further discussed below in conjunction with FIGS. 4-7.

Figure 4:
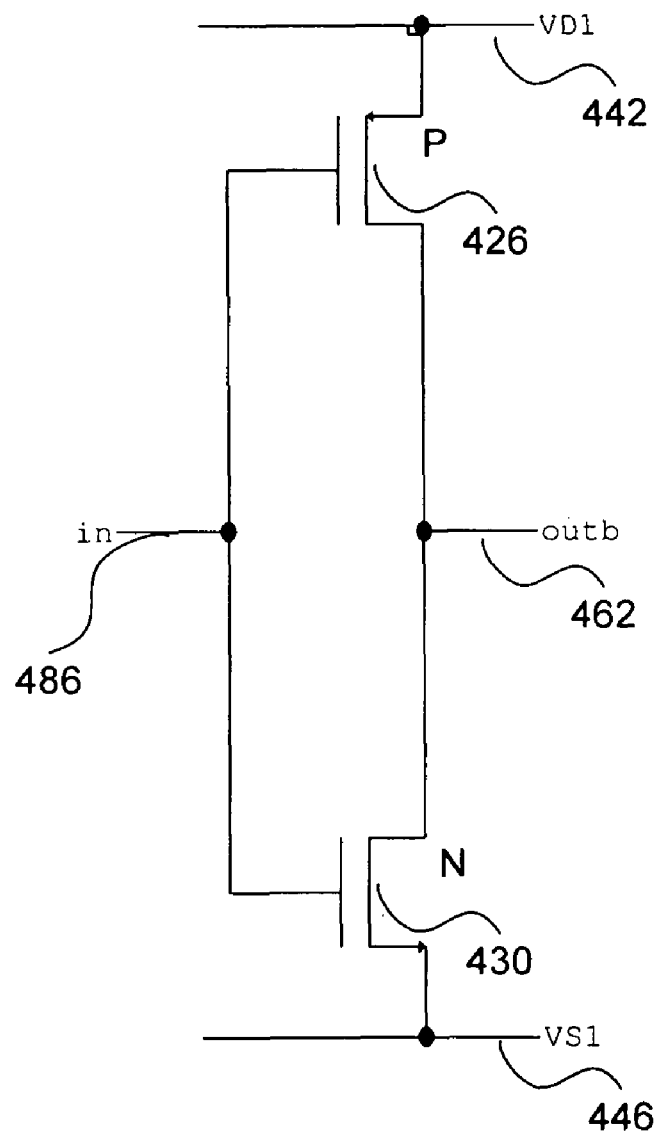
FIG. 4 is a schematic diagram illustrating a conventional unit Gm cell.

Referring now to FIG. 4, a block diagram for one embodiment of a unit Gm cell 422 is shown. In alternate embodiments, Gm cell 422 may be implemented using components and configurations in addition to, or instead of, certain of those components and configurations discussed in conjunction with the FIG. 4 embodiment.

In the FIG. 4 embodiment, a unit Gm cell 422 based on a simple CMOS inverter is shown. A fixed supply voltage, Vcore (VD1 442), biases the cell 422 and a voltage VS1 466 is typically at ground potential. In typical configurations, a feedback resistor (not shown) is connected from output signal outb 462 to input signal in 486 to effect an FE input stage for TIA 222 (FIG. 2). Therefore, the gate and drain voltages are at substantially the same potential and so the PMOS and NMOS transistors (transistor P 426 and transistor N 430) form a potential divider and both share the same drain current.

Furthermore, typical voltage amplitudes at the gate and drain are in the tens of mV range. Therefore drain voltage excursions have a wide margin of drain-source voltage, VDS, before the onset of triode mode. This wide margin is due to the "stacking" nature of the NMOS and PMOS Vgs. In other words, for the FIG. 4 Gm cell 422, the supply voltage, Vcore (here VD1 442), may be expressed by the formula:

$$Vcore=-Vgs,P+Vgs,N$$

where −Vgs,P is the voltage across transistor P 426 and Vgs,N is the voltage across transistor N 430. The supply voltage for the FIG. 4 embodiment is therefore the sum of the voltages across transistor P 426 and transistor N 430. Additional details regarding the implementation and utilization of improved unit Gm cells are further discussed below in conjunction with FIGS. 5-7.

Figure 5A:
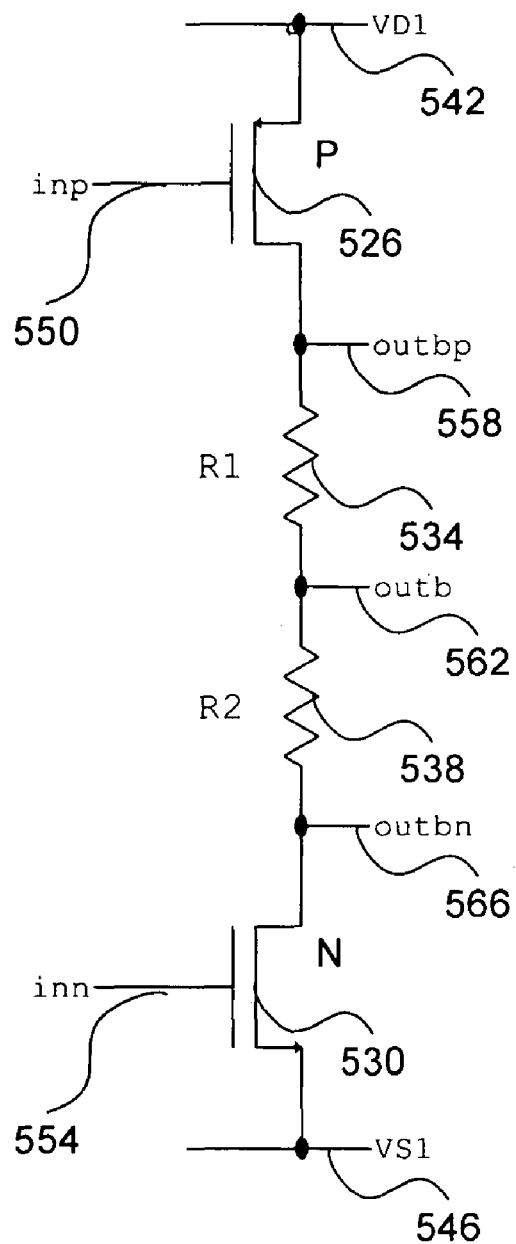
FIG. 5A is a schematic diagram for a first embodiment of a unit Gm cell, in accordance with the present invention.
Figure 5B:
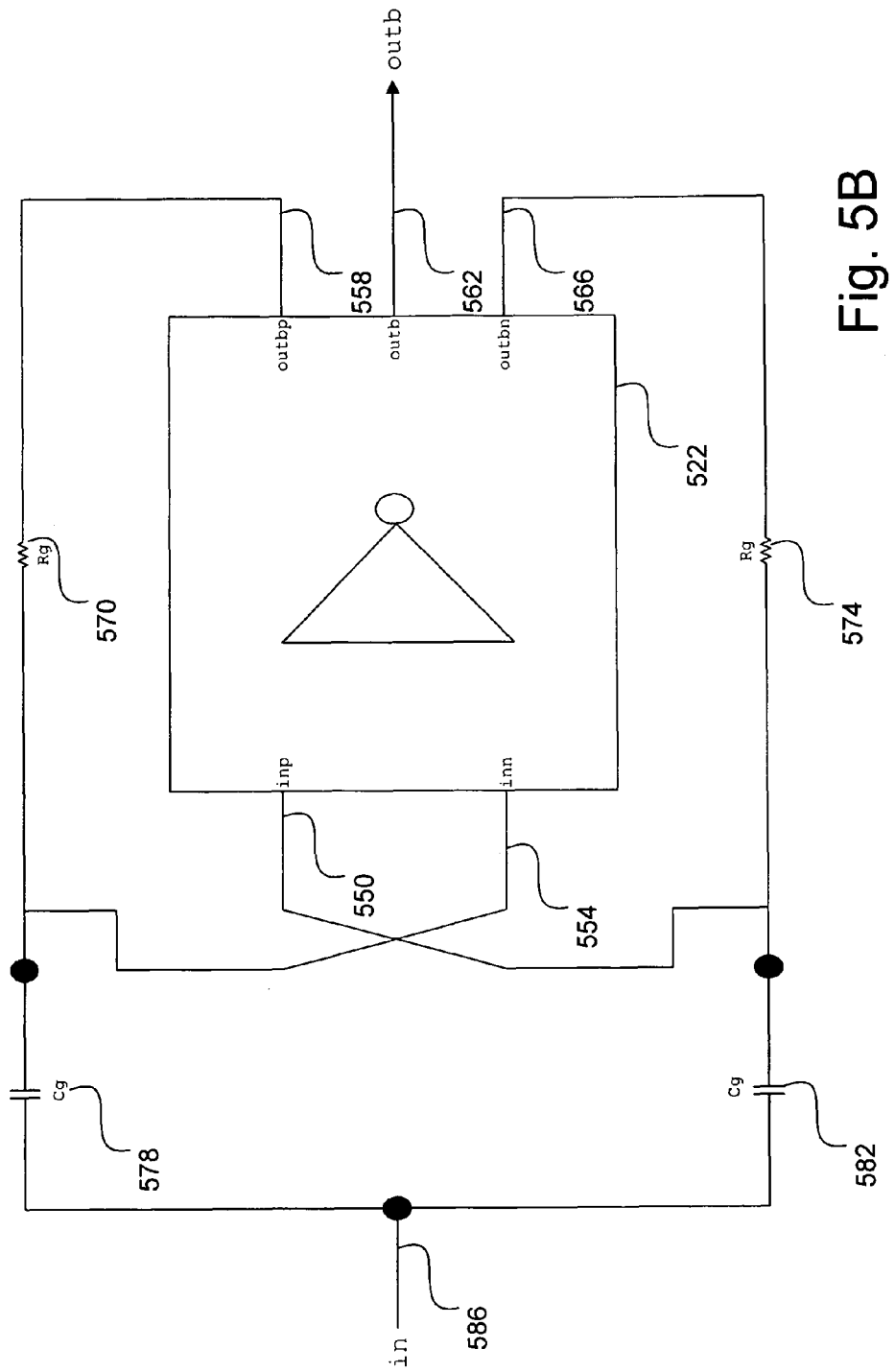
FIG. 5B is a schematic diagram illustrating an electronic circuit for biasing a unit Gm cell, in accordance with the present invention.

Referring now to FIGS. 5A and 5B, schematic diagrams for implementing (5A) and biasing (5B) a unit Gm cell 522 are shown, in accordance with one embodiment of the present invention. In alternate embodiments, unit Gm cells may be implemented using components and configurations in addition to, or instead of, certain of those components and configurations discussed in conjunction with the FIG. 5 embodiments.

In the FIG. 5A embodiment, Gm cell 522 includes an upper-rail supply voltage (VD1 542) which provides a Vcore supply voltage to power Gm cell 522. Gm cell 522 also includes a lower-rail voltage VS1 546 that is typically at or near a ground potential of zero volts. In the FIG. 5A embodiment, the gate of a P-channel transistor P 526 receives an input signal P (inp) 550. The source of transistor P 526 is connected to supply voltage VD1 542, and the drain of transistor P 526 is connected to a first end of a first level-shifting resistor R1 534. An output signal P (outbp) 558 is generated at the junction of the drain of transistor P 526 and the first end of level-shifting resistor R1 534.

In the FIG. 5A embodiment, the gate of an N-channel transistor N 530 receives an input signal N (inn) 554. The source of transistor N 530 is connected to voltage VS1 546, and the drain of transistor N 530 is connected to a second end of a second level-shifting resistor R2 538. An output signal N (outbn) 566 is generated at the junction of the drain of transistor N 530 and the second end of level-shifting resistor R2 538. In the FIG. 5A embodiment, a second end of level-shifting resistor R1 534 is connected to a first end of level-shifting resistor R2 538. A main output signal (outb) 562 is generated at the junction of the second end of level-shifting resistor R1 534 and the first end of level-shifting resistor R2 538.

In the FIG. 5B embodiment, a biasing circuit is shown for effectively implementing the unit Gm cell 522 of FIG. 5A. In the FIG. 5B embodiment, many of the numbered components refer back to similarly-numbered components shown in FIG. 5A. In the FIG. 5B embodiment, a main input signal 586 is provided through a first coupling capacitor Cg 578 to an input N (inn) 554 of the Gm cell 522. Similarly, the main input signal 586 is provided through a second coupling capacitor Cg 582 to the input P (inp) 550 of the Gm cell 522.

In the FIG. 5B embodiment, the output P (outbp) 558 of Gm cell 522 is returned as a bias voltage through a first bias resistor Rg 570 to the input N (inn) 554 of Gm cell 522. Similarly, the output N (outbn) 566 of Gm cell 522 is returned as a bias voltage through a second bias resistor Rg 574 to the input P (inp) 550 of Gm cell 522. In accordance with the present invention, the biasing configuration shown in FIG. 5B for Gm cell 522 advantageously reduces the required Vcore (VD1 542 of FIG. 5A) for a given Icore, and hence a given Gm, by adding level-shifting resistor R1 534 and level-shifting resistor R2 538 (FIG. 5A). This significant reduction in the required supply voltage VD1 542 provides substantial conservation of power resources for any electronic device that employs unit Gm cell 522.

In the FIG. 5 embodiment, the input gates ("inn" and "inp") of NMOS transistor 530 and PMOS transistor 526 are connected to the drains ("outbp" and "outbn") of NMOS transistor 530 and PMOS transistor 526, respectively, through the large bias resistors Rg (570 and 574) that carry zero DC current. Signal current is coupled by the AC coupling capacitors Cg (578 and 582). In certain embodiments, exemplary component values may approximately be: Icore=440 uA, R1=R2=250 ohm, Rg=1 Mohm, Cg=1.6 pF.

Thus, when biased with a constant current of Icore, both the NMOS and PMOS devices will have the same Vgs and same Gm as in the unit Gm cell 422 shown in FIG. 4. However the required supply voltage headroom, Vcore, is given by the equation:

$$Vcore=-Vgs,P-Icore\times(R1+R2)+Vgs,N$$

where −Vgs,P is the voltage across transistor P 526, Vgs,N is the voltage across transistor N 530, and Icore×(R1+R2) is the voltage across level-shifting resistors 534 and 538.

Therefore, provided that the voltage drop Icore×(R1+R2) does not cause the transistors to enter triode mode, the same effective Gm is achieved but with a lower required voltage supply headroom, Vcore. To support a given constant Gm over process and temperature, the new unit Gm cell 522 thus requires less nominal supply voltage and so less power. Additional details regarding the implementation and utilization of unit Gm cells are further discussed below in conjunction with FIGS. 6-7.

Figure 6A:
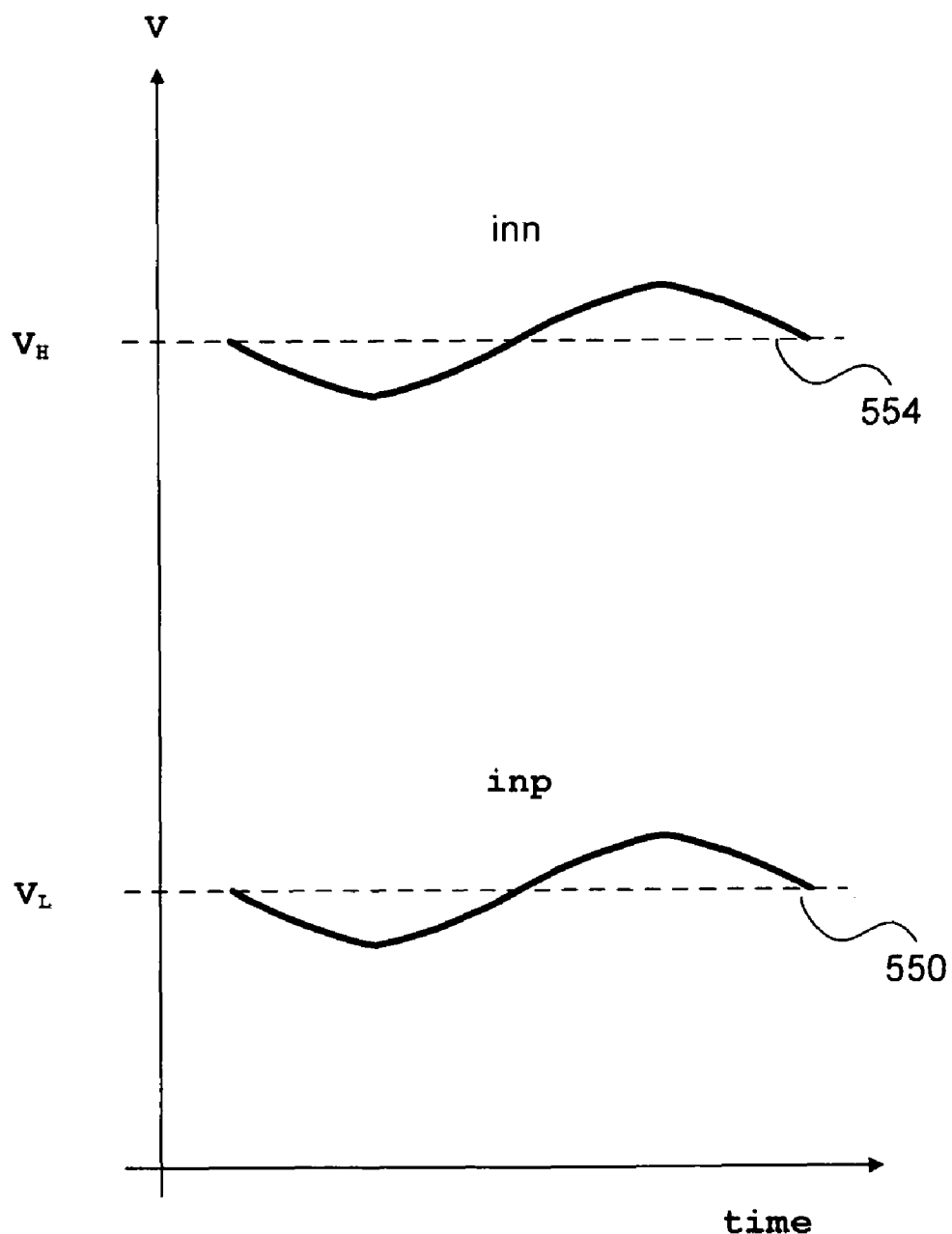
FIG. 6A is a graph illustrating input signals for the unit Gm cell of FIG. 5, in accordance with one embodiment of the present invention.
Figure 6B:
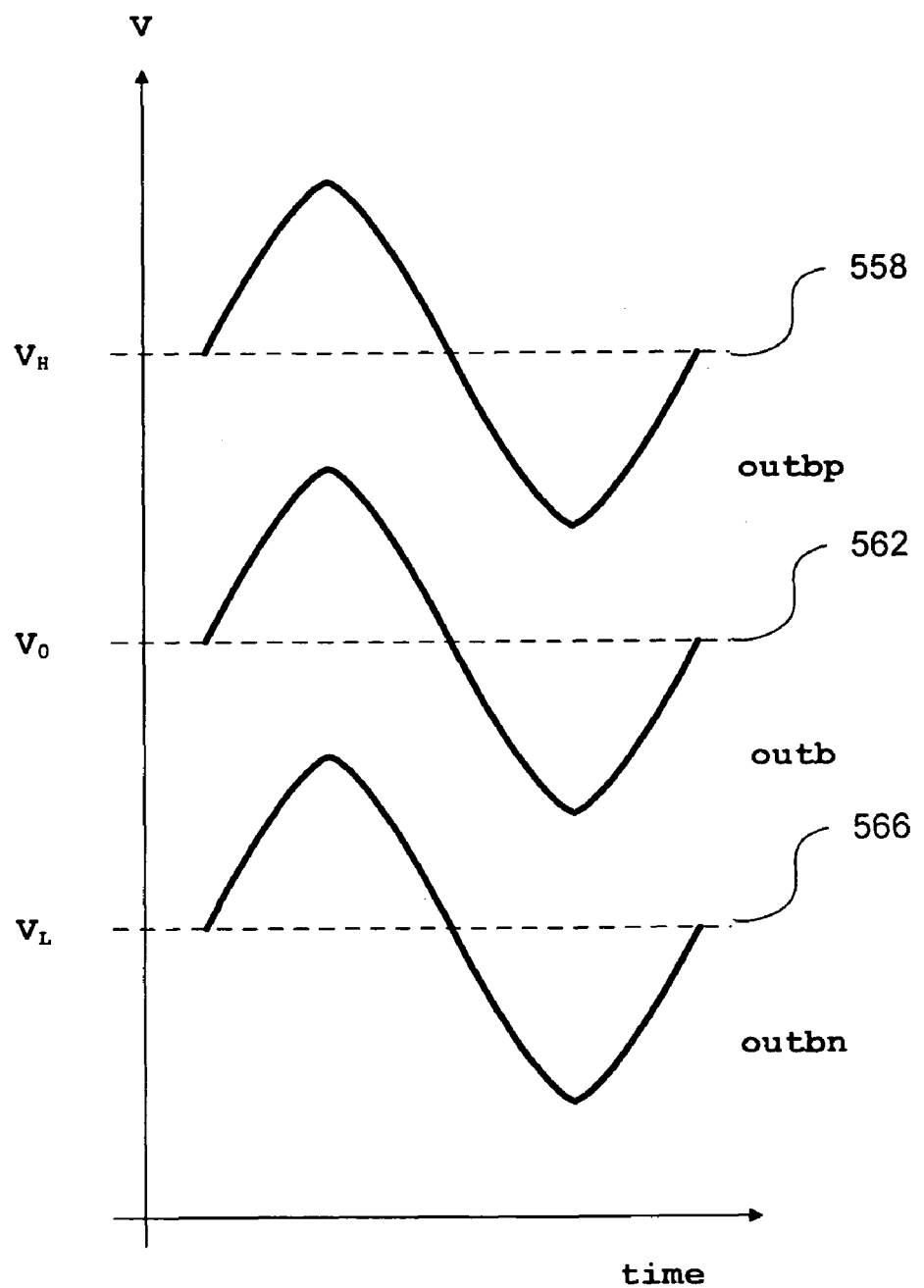
FIG. 6B is a graph illustrating output signals for the unit Gm cell of FIG. 5, in accordance with one embodiment of the present invention.

Referring now to FIGS. 6A and 6B, graphs illustrating exemplary input signals and output signals for unit Gm cell 522 are shown, in accordance with one embodiment of the present invention. The FIG. 6 graphs are presented for purposes of illustration, and may be best understood when viewed in conjunction with the foregoing FIGS. 5A and 5B in which certain components and signals correspond to similarly numbered components and signals in the FIG. 6 examples. The FIG. 6 waveforms are presented for purposes of illustration, and in alternate embodiments, the present invention may readily utilize waveforms, timing relationships, and functionalities, in addition to, or instead of, certain of those waveforms, timing relationships, and functionalities discussed in conjunction with the FIG. 6 examples.

In the FIG. 6A example, a graph shows voltage on a vertical axis and time on a horizontal axis. In the FIG. 6A graph, an input signal N (inn) 554 and an input signal P (inp) 550 for the unit Gm cell 522 of FIG. 5A are shown. The input signals shown in the FIG. 6A example are both derived from a main input signal 586 (see FIG. 5B) that would typically be at a voltage level that is between the higher voltage level of input signal N (inn) 554 and the lower voltage level of input signal P (inp) 550. Input signal N (inn) 554 and input signal P (inp) 550 are offset from each other by bias signals received from respective bias resistors 570 and 574 (see FIG. 5B).

In the FIG. 6B example, a graph shows voltage on a vertical axis and time on a horizontal axis. In the FIG. 6B graph, an output signal P (outbp) 558, a main output signal (outb) 562, and an output signal N (outbn) 566 for the unit Gm cell 522 of FIG. 5A are shown. In the FIG. 6B example, output signal P (outbp) 558, main output signal (outb) 562, and output signal N (outbn) 566 are offset from each other by level-shifting resistors 534 and 538 (see FIG. 5A). In the FIG. 6B embodiment, output signal P (outbp) 558 and output signal N (outbn) 566 may be utilized to generate bias voltages for effectively biasing unit Gm cell 522, as shown and discussed above in conjunction with FIGS. 5A and 5B.

Figure 7:
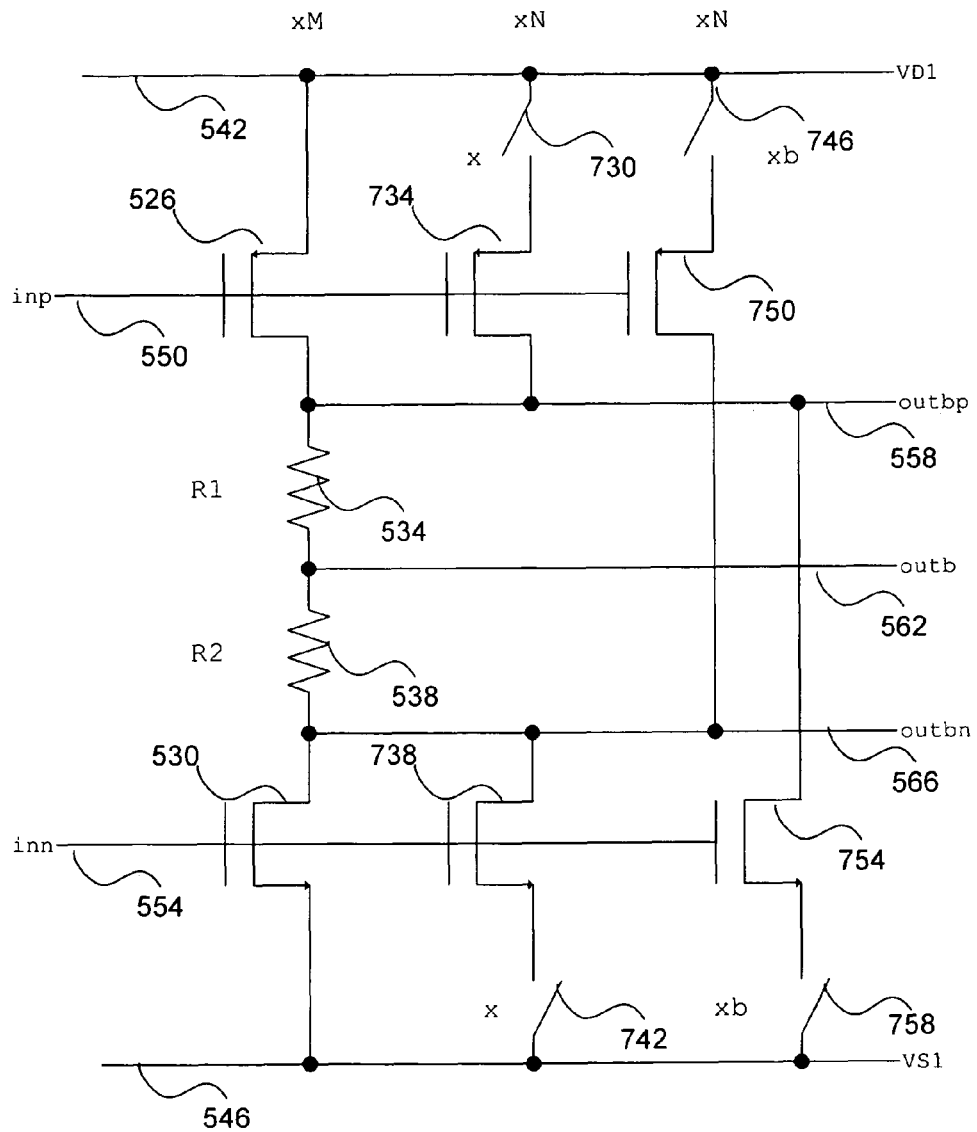
FIG. 7 is a schematic diagram for a second embodiment of a unit Gm cell, in accordance with the present invention.

Referring now to FIG. 7, a schematic diagram for a second embodiment of an expanded unit Gm cell 722 is shown, in accordance with one embodiment of the present invention. In alternate embodiments, expanded unit Gm cells may be implemented using components and configurations in addition to, or instead of, certain of those components and configurations discussed in conjunction with the FIG. 7 embodiment.

In the FIG. 7 embodiment, certain components and signals correspond to similarly-numbered components and signals from the unit Gm cell 522 of FIG. 5A. Similar to the FIG. 5A embodiment, the FIG. 7 embodiment includes a first cell branch that Includes VD1 542, a transistor P 526, input signal P 550, level-shifting resistors 534 and 538, a transistor N 530, an input signal N 554, and VS1 546. This first cell branch typically functions in a manner that is the same as, or similar to, the functionality of the unit Gm cell 522 of FIGS. 5A and 5B.

In addition, the FIG. 7 embodiment includes a second cell branch that includes a transistor P 734 and a transistor N 738 that may be switched in or out of expanded Gm cell 722 with switches 730 and 742 that operate in tandem. In the FIG. 7 embodiment, when the second cell branch is switched into expanded Gm cell 722, then the required Vcore (VD1 542) is lowered by a specified amount. Furthermore, the FIG. 7 embodiment includes a third cell branch that includes a transistor P 750 and a transistor N 754 that may be switched in or out of expanded Gm cell 722 with switches 746 and 758 that operate in tandem. In the FIG. 7 embodiment, when the third cell branch is switched into expanded Gm cell 722, then the required Vcore is raised by a specified amount. Accordingly, expanded Gm cell 722 may advantageously adapt to varied power supply requirements.

The basic unit Gm cell 522 of FIG. 5 introduces a fixed level shift of Icore×(R1+R2) to reduce Vcore. In some instances the required level shift voltage for SLOW corners may force the transistors into triode mode at the opposite, FAST corner. Therefore, level shifting may be digitally switched as shown in the FIG. 7 embodiment of expanded Gm cell 722. In this case, additional switch controls and 'xb' are provided. In the FIG. 7 embodiment, switch control 'x' controls switches 730 and 742, and switch controls 'xb' controls switches 746 and 758.

Signal 'xb' is the logical inverse of signal. When signal is logically low, the switches 730 and 742 are open and switches 746 and 758 are closed. In this condition, the supply current, Icore, is split between the first cell branch and the third cell branch. The third cell branch bypasses the level shift resistors, R1 (534) and R2 (538), reducing the level shift voltage and hence increases the Vcore voltage (VD1 542). In the opposite case, with signal 'x' logically high, switches 730 and 742 are closed and switches 746 and 758 are open. The supply current, Icore, is split between the first cell branch and the second cell branch. This second cell branch does not bypass the level shift resistors 534 and 538, and so this increases the level shift voltage, as well as decreasing the Vcore voltage. In certain embodiments, the number of digital switches is not limited to two. An arbitrary number of tandem switched branches may be added to effect an arbitrary number of offset voltages. In this way, any desired Vcore may be programmed while still maintaining a desired fixed "Gm."

To summarize, the supply voltage, Vcore, for a given Icore bias current is given by the following equations:

Signal 'x'=low: $Vcore = -Vgs,P - (M-N)/(M+N) \times Icore \times (R1+R2) + Vgs,N$ Signal 'x'=high: $Vcore = -Vgs,P - Icore \times (R1+R2) + Vgs,N$ Therefore the required Vcore can be tailored to any particular process corner while maintaining a constant Gm. For all of the foregoing reasons, the present invention provides an improved system and method for effectively implementing a unit Gm cell.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. An apparatus for implementing a unit Gm cell, comprising:
   an input P that receives an input P signal;
   an input N that receives an input N signal;
   an output P that generates an output P signal, said output P being connected through a first bias resistor directly to said input N;
   an output N that generates an output N signal, said output N being connected through a second bias resistor directly to said input P; and
   a main output that generates a main output signal from said unit Gm cell to one or more downstream devices.

2. The apparatus of claim 1 wherein said unit Gm cell is utilized in a front end of a transimpedance amplifier of a receiver device.

3. The apparatus of claim 1 wherein said unit Gm cell includes level-shifting resistors that cause said output P signal and said output N signal to be at different respective voltage levels.

4. The apparatus of claim 3 wherein said unit Gm cell includes a Vcore supply voltage and a VS1 voltage, said Vcore supply voltage providing operating power for said unit Gm cell.

5. The apparatus of claim 4 wherein said Vcore supply voltage is reduced by a conserved voltage potential across said level-shifting resistors to economically operate said unit Gm cell at a reduced supply voltage level.

6. The apparatus of claim 1 further comprising a main input that receives a main input signal that is coupled to said input N and said input P through respective coupling capacitors.

7. An apparatus for implementing a unit Gm cell, comprising:
an input P that receives an input P signal;
an input N that receives an input N signal;
an output P that generates an output P signal, said output P being connected through a first bias resistor to said input N;
an output N that generates an output N signal, said output N being connected through a second bias resistor to said input P; and
a main output that generates a main output signal from said unit Gm cell to one or more downstream devices, said unit Gm cell includes including a Vcore supply voltage to which a source of a transistor P is attached.

8. The apparatus of claim 7 wherein said input P is connected to a gate of said transistor P to provide said input signal P to said unit Gm cell.

9. The apparatus of claim 8 wherein said unit Gm cell includes a VS1 voltage to which a source of a transistor N is attached.

10. The apparatus of claim 9 wherein said input N is connected to a gate of said transistor N to provide said input signal N to said unit Gm cell.

11. The apparatus of claim 10 wherein said unit Gm cell includes a first level-shifting resistor and a second level-shifting resistor that are connected in series, a drain of said transistor P being connected to a first end of said first level-shifting transistor, a second end of said first level-shifting transistor being connected to a first end of said second level-shifting transistor, a second end of said second level-shifting transistor being connected to a drain of said transistor N.

12. The apparatus of claim 11 wherein said output P is generated where said drain of said transistor P and said first end of said first level-shifting resistor are connected, said output N being generated where said drain of said transistor N and said second end of said second level-shifting resistor are connected, said main output being generated where said second end of said first level-shifting resistor and said first end of said second level-shifting resistor are connected.

13. The apparatus of claim 12 wherein said Vcore supply voltage is expressed by a formula:

$$Vcore = -Vgs,P - Icore \times (R1+R2) + Vgs,N$$

where $-Vgs,P$ is a voltage across said transistor P, $Vgs,N$ is a voltage across said transistor N, and $Icore \times (R1+R2)$ is a voltage across said first level-shifting resistor and said second level-shifting resistor.

14. The apparatus of claim 1 wherein said input P signal is at a lower voltage level than said input signal N.

15. The apparatus of claim 1 wherein said output P signal is at a higher voltage level than said output signal N.

16. The apparatus of claim 12 wherein said unit Gm cell is implemented as an expanded unit Gm cell that includes a second branch circuit and a third branch circuit.

17. The apparatus of claim 12 wherein said second branch circuit includes a second transistor P and a second transistor N that can be switched into said expanded unit Gm cell with a first pair of tandem switches, said third branch circuit including a third transistor P and a third transistor N that can be switched into said expanded unit Gm cell with a second pair of tandem switches.

18. The apparatus of claim 17 wherein said Vcore supply voltage is reduced when said second branch circuit is switched into said expanded unit Gm cell.

19. The apparatus of claim 17 wherein said Vcore supply voltage is increased when said third branch circuit is switched into said expanded unit Gm cell.

20. A method for implementing a unit Gm cell, comprising the steps of:
receiving an input P signal with an input P;
receiving an input N signal with an input N;
generating an output P signal from an output P that is connected through a first bias resistor directly to said input N;
generating an output N signal from an output N that is connected through a second bias resistor directly to said input P; and
generating a main output signal from a main output of said unit Gm cell to one or more downstream devices.

* * * * *